United States Patent
Neidig et al.

(10) Patent No.: US 9,323,242 B2
(45) Date of Patent: Apr. 26, 2016

(54) METHOD FOR SETTING AN OPERATING STATUS

(71) Applicant: Siemens Aktiengesellschaft, Munich (DE)

(72) Inventors: Jorg Neidig, Nuremberg (DE); Bernd Opgenoorth, Nuremberg (DE); Michael Pirker, Munich (DE); Christian Seitz, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 594 days.

(21) Appl. No.: 13/632,803

(22) Filed: Oct. 1, 2012

(65) Prior Publication Data

US 2013/0085583 A1 Apr. 4, 2013

(30) Foreign Application Priority Data

Sep. 29, 2011 (EP) .................................. 11183292

(51) Int. Cl.
*G05B 13/02* (2006.01)
*G05B 19/045* (2006.01)

(52) U.S. Cl.
CPC .... *G05B 19/045* (2013.01); *G05B 2219/23289* (2013.01); *G05B 2219/25289* (2013.01); *Y02P 90/083* (2015.11)

(58) Field of Classification Search
USPC .......................................................... 700/28
See application file for complete search history.

(56) References Cited

U.S. PATENT DOCUMENTS

| 5,469,553 | A | 11/1995 | Patrick ........................... 713/323 |
| 6,345,259 | B1 * | 2/2002 | Sandoval ...................... 705/7.11 |
| 6,823,220 | B2 | 11/2004 | Mathew et al. ................. 700/31 |
| 7,809,457 | B2 | 10/2010 | Yuan et al. ..................... 700/101 |
| 2003/0069651 | A1 | 4/2003 | Mathew et al. ................. 700/31 |
| 2009/0112343 | A1 | 4/2009 | Yuan et al. ..................... 700/101 |
| 2010/0235685 | A1 | 9/2010 | Shin ............................... 714/37 |
| 2011/0047552 | A1 | 2/2011 | Mergen et al. ................. 718/102 |

FOREIGN PATENT DOCUMENTS

CN 101615313 A 12/2009 ............ G07C 11/00

OTHER PUBLICATIONS

Dietmair, A. et al., "Zustandsbasierte Energieverbrauchsprofile: Eine Methode zur Effizienten Erfassung des Energieverbrauchs von Produktionsmaskinen," WT Werkstattstechnik Online, vol. 89, No. 7/8, 15 pages (German language w/ English translation), Dec. 31, 2008.
Chinese Office Action, Application No. 201210370983.9, 10 pages, Jun. 20, 2014.

* cited by examiner

*Primary Examiner* — Carlos Ortiz Rodriguez
(74) *Attorney, Agent, or Firm* — Slayden Grubert Beard PLLC

(57) ABSTRACT

Operating status transitions of production plants according to the PROFIEnergy standard are increasingly provided for the energy management of an individual component within a plant. The definition of an operating status change for an individual component leaves unsolved the problem as to how an operating status change of a plant having multiple components is to be effected. Thus, methods and systems that support an automatic operating status change of a plant consisting of a multiplicity of components are provided herein.

16 Claims, 2 Drawing Sheets

METHOD FOR SETTING AN OPERATING STATUS

CROSS-REFERENCE TO RELATED APPLICATIONS

This application claims priority to EP Patent Application No. 11183292.9 filed Sep. 29, 2011. The contents of which is incorporated herein by reference in its entirety.

TECHNICAL FIELD

This disclosure relates to a method for setting an operating status of a plant consisting of a multiplicity of components, a computer program product and use of an overall operating status model.

BACKGROUND

A development of available operating statuses for electronic devices of all kinds is currently in progress, by means of which the operating statuses hitherto restricted to >>On<< and >>Off<< are augmented by further variants.

Known further variants of operating statuses comprise for example a state known in the technical world as >>Hibernation<< another known as >>Idle<< and a further one known as >>Standby<<. In addition further operating statuses are known, by means of which productive operation of an electronic device is temporarily suspended, which can subsequently be reactivated with brief preparations or delays, as would have been possible by means of an operating status change from the operating status >>off<<.

In components of production and manufacturing plants too, hereinafter referred to as plants, which in modern embodiments also always comprise electronic processors, in the wake of increased attention to the energy consumption of the components, extended operating statuses are increasingly implemented. Components should for example be taken to mean not only processing devices or robots of a production line, but also devices such as conveyor belts or motors, which are frequently provided with an at least minimal electronic controller and a more or less distinct communication interface for the exchange of process and operating data.

FIG. 4 shows an operating status model in the form of an automatic status system, by means of which energy management at component level is realized through the provision of operating statuses. A circle arranged at the left-hand edge of the operating status model symbolizes a first operating status IDL or >>Idle<< of the component, while a circle arranged in the center symbolizes a second operating status STB or >>Standby<< of the component and a circle arranged at the outer right-hand end symbolizes a third operating status HIB or >>Hibernate<< of the component.

Each operating status HIB, IDL, STB in the operating status model is provided with a quantity of parameters (not shown). Within this quantity of parameters, periods of time can for example be defined, which specify how long at the most or the least a respective operating status can be maintained. Changes of operating status between the individual operating statuses HIB, IDL, STB are symbolized by curved arrows. An operating status change from the first operating status IDL to the second operating status STB is possible, but from the second operating status STB to the third operating status HIB is not. Each change of status requires a certain period of time, which can likewise be defined by the operating status model.

An operating status model according to or similar to FIG. 4 is for example also provided for the energy management of an individual component of a plant according to the PROFIEnergy standard. The PROFIenergy standard further provides an interface to PROFINET. PROFINET (Process Field Network) is an open standard for the use of the Industrial Ethernet for automation purposes. An operating status change of individual components of a plant can be effected via the aforementioned interface.

The definition of an operating status change for an individual component leaves unsolved the problem as to how an operating status change of a plant consisting of a multiplicity of components is to be effected.

However it is precisely the complex interdependence of the components that poses a major challenge in the case of shutdown or powering-up or, generally speaking, during the operating status change of plants. Currently the sequence observation of components in a plant must be handled manually. No automatic support yet exists for identifying the interdependencies of a plant, so that this step too must be performed manually.

SUMMARY

In one embodiment, a method for setting an operating status of a plant consisting of a multiplicity of components may comprise the following steps: determining the structural dependency of at least one component of the plant through the analysis of a structural model; determining the operating status change behavior of at least one component of the plant through the analysis of an operating status model; determining a process-related dependency of at least one component of the plant through the analysis of a process model; and determining an overall operating status model of the plant based on the structural and process-related dependencies and the operating status change behavior of at least one component, wherein the overall operating status model prescribes a temporal behavior of at least one component in the case of a change in the operating status of the plant.

In a further embodiment, the operating status model defines at least one operating status possible for this component. In a further embodiment, the operating status model contains details of the energy consumption for at least one operating status of the component. In a further embodiment, the operating status model defines the temporal duration for at least one operating status change of the component. In a further embodiment, the structural model maps a structural interoperation of a component with at least one further component. In a further embodiment, the process model maps the process dependency of a component with at least one further component. In a further embodiment, a modified overall operating status model is determined from the overall operating status model thus created in such a way that optimal status transitions are determined from the created overall operating status model, and only these are taken into account in the modified overall operating status model. In a further embodiment, an operating status change sequence of at least one component of the plant is determined from the overall operating status model in the case of a predefinable operating status change of the plant.

In another embodiment, a computer program product is stored in computer-readable media of a process planning system and executable by a processor to perform any of the methods disclosed above. In another embodiment, an overall operating status model as disclosed above is used in a process control system.

BRIEF DESCRIPTION OF THE DRAWINGS

Example embodiments will be explained in more detail below with reference to figures, in which.

DETAILED DESCRIPTION

Figure 1:
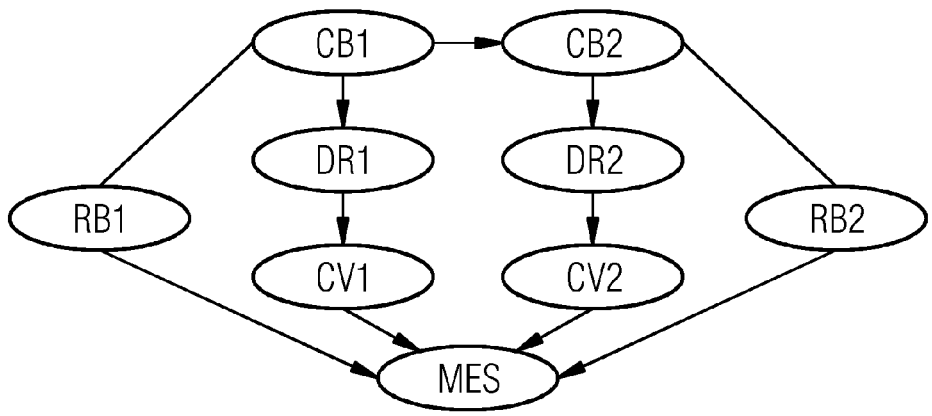
FIG. 1 shows a structural diagram for the schematic representation of an overall operating status model of a plant.

Some embodiments provide a method which supports an automatic operating status change of a plant consisting of a multiplicity of components.

For example, one embodiment provides a method for setting an operating status of a plant consisting of a multiplicity of components, which may include the following steps:

- determining a structural dependency of at least one component of the plant through the analysis of a structural model;
- determining an operating status change behavior of at least one component of the plant through the analysis of an operating status model;
- determining a process-related dependency of at least one component of the plant through the analysis of a process model;
- determining an overall operating status model of the plant based on the structural and the process-related dependencies and the operating status change behavior of at least one component, wherein the overall operating status model prescribes the temporal behavior of at least one component in the case of an operating status change of the plant.

The sequence of the first three determining steps is furthermore entirely arbitrary, so the determining of the structural dependency, the determining of the operating status change behavior and the determining of the process-related dependency can also take place in a sequence other than that represented.

Certain embodiments are based on at least one structural model, at least one process model and on an operating status model, which ideally but not necessarily exists for almost every component of a plant.

The structural model and the process model may take account of structural dependencies between the components of the plant, which derive for example from the mechanical makeup or the realized process. Thus for example a machine depends on a delivery from a conveyer belt. Were the machine to be switched off without previously shutting down the conveyer belt, an over-production of unfinished products would ensue. If an actuator is actuated via a module, the switching-off of the module of course results in a functional stoppage of the actor.

The structural model can for example be derived from an engineering tool such as COMOS, which contains circuit diagrams, pipeline plans, plant structure etc.

The process model may contain generic rules for a shutdown or for other operating status transitions. These rules have for example the following contents: >>In a sequence of conveyor belts, shutdown always takes place in the order of the goods transport<< or >>components with external cooling must be switched off last<< etc.

The operating status model, which may be structured in a semantic description language, may contain possible operating statuses and/or details of the energy consumption of a particular operating status. In addition the operating status model may contain details of the required duration of a switch from a particular operating status into another particular operating status.

The overall operating status model may be created from the aforementioned models. This overall operating status model may reflect all the temporal dependencies for the shutdown. Based on the dependency graphs an optimum switch-off sequence of individual components or any other desired operating status change of individual components in the case of a shutdown or an operating status change of the entire plant can be determined.

The creation of an overall operating status model of the plant as described herein may take place for example through the formation of a dependency graph of the manufacturing process of the plant relating to all manufacturing subprocesses, wherein the dependency graph reflects temporal dependencies for an operating status change of the entire plant. Based on this overall operating status model or dependency graphs respectively, it is possible to determine an optimal sequence for the operating status change of individual components in the case of a desired operating status change of the plant.

Through the use of the methods disclosed herein, a plant planner may be freed of the previous burden of creating a plant model in a completely manual manner. Instead of this, the modeling of dependencies between the components may be the only required aspect, which may significantly speed up the engineering process.

In some embodiments, at least one component-based operating status model contains details of the energy consumption for at least one operating status of the component. This embodiment permits the determining of an operating status which is optimal in respect of the energy consumption of the plant for a given load or in the case of the plant being in idling mode.

A further embodiment of the method provides for a modified overall operating status model to be determined from the created overall operating status model in such a way that optimal status transitions are determined from the created overall operating status model, and these taken into account as a reduced status graph in the modified overall operating status model.

This development of certain embodiments is based on the knowledge that the overall operating status model created is possibly only an initial working basis, which can be improved by means of optimizations. The overall operating status model that arises frequently uses too many degrees of freedom, as not all restrictions have been explicitly modeled. This means that the plant planner wishes to further limit the possibilities for operating status change provided in the overall operating status model. This restriction is effected by determining optimal status transitions. After this modification, the modified overall operating status model is optionally verified on the plant or on a model of the plant and thus new optimal changes of operating status determined. The method according to this embodiment is repeated multiple times if applicable, and can in the process also lead to a modification of the process and/or structural models. Such an iterative approach thus guarantees a permanent improvement in the process.

The operating status change of the plant using the overall operating status model can either be controlled centrally, that is on a process control system or »Manufacturing Execution System«, as the case may be, or locally, that is on an individual component in conjunction with other components.

The process of determining the overall operating status model can also take place centrally or locally.

In a centralized approach the respective process and/or structural models and operating status models may be transferred to a central system, in order then to perform a central analysis. In that case the central system can interact with Engineering Tools.

In the case of a local approach, the analysis may be distributed across a multiplicity of process steps or components. This may provide a variant in which each component has its own data processing facilities and communication unit.

Figure 2:
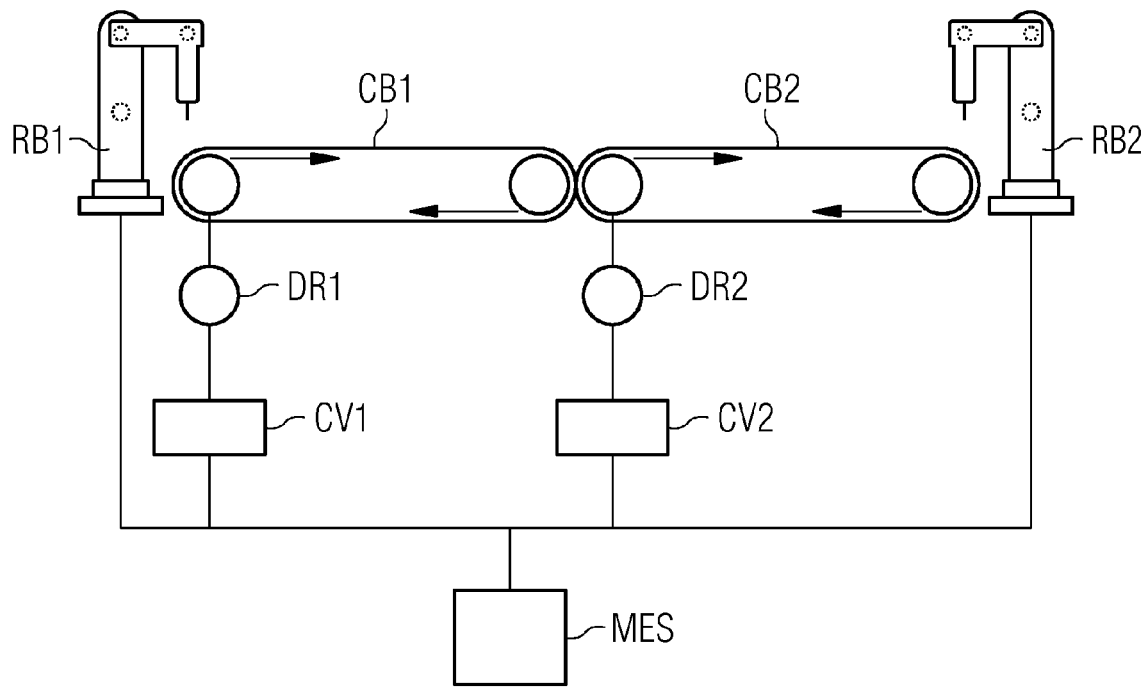
FIG. 2 shows a structural diagram for the schematic representation of a plant consisting of individual components.

FIG. 2 shows an exemplary extract from a plant having multiple components, including a first robot RB1, a second robot RB2, a first conveyor belt CB1, a second conveyor belt CB2, a first motor DR1, a second motor DR2, a first converter CV1, a second converter CV2 and a process control system MES.

According to an exemplary embodiment the following procedure is followed for the process of determining of an overall operating status model of the plant.

The first step involves the determining of a structural dependency between components of the plant through the analysis of one or more structural models. Ideally, the structural dependency of those components which play a role in an operating status change of the plant is here determined.

Such a structural dependency is for example determined from a project model created for the automation planning for the plant. This project model for example reveals that the control system MES is connected to the robots RB1, RB2 and the converters CV1, CV2 via the communication standard PROFINET. It is further revealed for example from circuit diagrams, that the motors DR1, DR2 are connected to the converters CV1, CV2.

Figure 4:
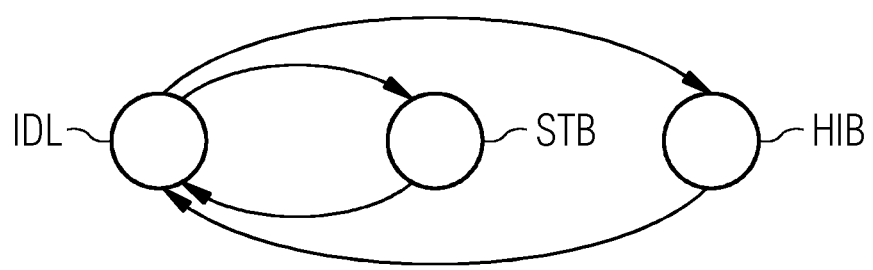
FIG. 4 shows a structural diagram for the schematic representation of a known operating status model of an individual component.

In a second step the determining of an operating status change behavior of at least one component of the plant takes place through the analysis of an operating status model of the respective component. Switch-off conditions which are for example present in a similar manner to FIG. 4 are among items read from the operating status models stored in the individual components, which for example define the duration of a switch-off procedure, the duration of a powering-up procedure and a minimum and maximum switch-off time. As already mentioned, other operating statuses in addition to »On« and »Off« are also taken into account in the operating status model, such as an idle state, standby mode operation etc.

In a third step, determining of the process-related dependency takes place through the analysis of a process model. To this end a formal process description is for example analyzed, from which it is evident that the components RB1, RB2 are robots RB1, RB2 and that the motors DR1, DR2 drive the conveyer belts CB1, CB2. It is further determined that process goods to be processed pass through the cited components RB1, CB1, CB2, RB2 in this order.

Furthermore, generic switch-off rules are for example defined in the process model. An associated data set contains, for example, the following rules:

The conveyor belts CB1, CB2 must be switched off in the order of the direction of running;
The robots RB1, RB2 and conveyor belts linked thereto CB1, CB2 can be switched off at the same time; and;
The control system MES is switched off last.

On the basis of the determined structural dependencies and of the operating status change behavior, the creation of an overall operating status model of the plant takes place, initially in the form of a largely self-explanatory dependency graph according to FIG. 1.

By means of a search strategy applied to the dependency graph shown in FIG. 1, a switch-off sequence is subsequently determined, which can for example be exported to a corresponding process control system. The dependency graph is possibly imported in part from a project planning tool.

Figure 3:
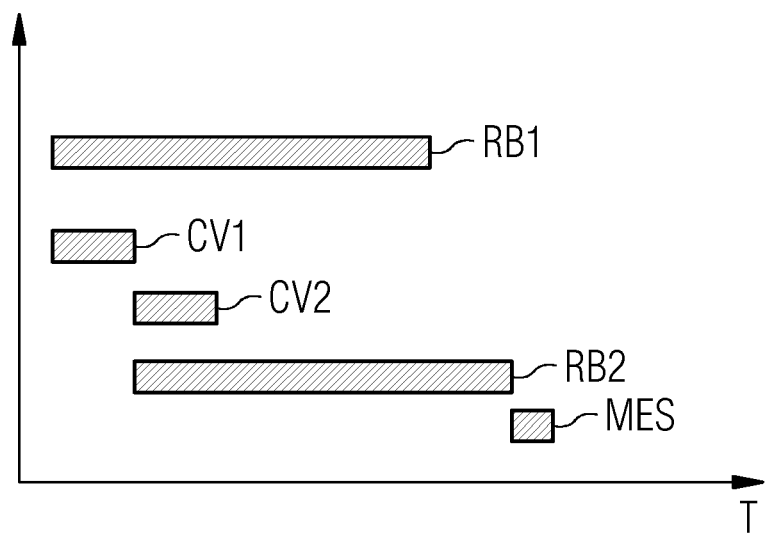
FIG. 3 shows a flow chart for the schematic representation of a temporal dependency of operating status changes of individual components.

The result of the determining of the switch-off sequence is in the form of a flow chart with a switch-off sequence as shown in FIG. 3. In this flow chart according to FIG. 3, the time is plotted along the T axis. The start and duration of the switch-off process for individual components RB1, CV1, CV2, RB2, MES are in each case plotted as black bars over the time T.

In one embodiment a modified overall operating status model is determined from the created overall operating status model, which is illustrated once more with reference to FIG. 1. With the creation of the modified overall operating status model optimal status transitions are determined from the overall operating status model created, and only these taken into account in the modified overall operating status model. The determining of optimal status transitions takes place for example using node reduction means.

FIG. 1 shows the cited dependency graph for an operating status change of components of the plant. In other words the dependency graph contains the present components of the plant as a node set. In the graph there is an undirected edge between two nodes u and v when both nodes u and v can be switched off simultaneously. The two binary relations are combined into a relationship u≤v. The binary relation u≤v is transitive. As a result of this property, the edge set can be reduced.

What is claimed is:

1. A method for determining an optimal operating status of a plant comprised of multiple components, comprising:
   determining a set of structural dependencies between a set of components of the plant through the analysis of a structural model;
   determining a set of status transitions for the set of components of the plant through the analysis of an operating status model;
   determining a set of process dependencies for the set of components of the plant through the analysis of a process model; and
   determining an overall status model of the plant based on the structural dependencies, the process dependencies and the status transitions of the set of components, wherein the overall status model includes a set of status transition dependencies for the set of components; and
   using the set of status transition dependencies to determine a status setting for each component in the set of components in response to a status change of the plant.

2. The method of claim 1, wherein the operating status model specifies at least one status for each component in the set of components.

3. The method of claim 1, wherein the operating status model contains details of the energy consumption associated with a status of at least one component in the set of components and wherein the set of status transition dependencies are used to determine a status setting that optimizes energy consumption of the plant.

4. The method of claim 1, wherein the operating status model specifies a temporal duration for at least one status transition for at least one component in the set of components.

5. The method of claim 1, wherein the structural model specifies a structural dependency of a component with at least one other component in the set of components.

6. The method of claim 1, wherein the process model maps a process dependency out of the set of process dependencies for the set of components.

7. The method of claim 1, wherein a modified overall status model is determined from the overall status model wherein the modified overall status model specifies optimal status transitions of the set of components.

8. The method of claim 1, wherein the status transition dependencies are used to determine an optimal set of component status transitions in response to a status change of the plant.

9. Non-transitory computer-readable media storing a set of computer executable instructions, which when executed by a processor of a process planning system:
   determine a set of structural dependencies between a set of components of a plant through the analysis of a structural model;
   determine a set of status transitions for the set of components of the plant through the analysis of an operating status model;
   determine a set of process-related dependencies for the set of components of the plant through the analysis of a process model;
   determine an overall status model of the plant based on the structural dependencies, process dependencies and the status transitions of the set of components, wherein the overall status model includes a set of status transition dependencies for the set of components; and
   use the set of status transition dependencies to determine a status setting for each component in the set of components in response to a status change of the plant.

10. The non-transitory media of claim 9, wherein the operating status model specifies at least one status for each component in the set of components.

11. The non-transitory media of claim 9, wherein the operating status model contains details of the energy consumption associated with a status of at least one component of the set of components and wherein the status transition dependencies are used to determine a status setting that optimizes energy consumption of the plant.

12. The non-transitory media of claim 9, wherein the operating status model specifies a temporal duration for at least one status transition of at least one component in the set of components.

13. The non-transitory media of claim 9, wherein the structural model specifies a structural dependency of a component with at least one other component in the set of components.

14. The non-transitory media of claim 9, wherein the process model maps a process dependency out of the set of process dependencies for the set of components.

15. The non-transitory media of claim 9, wherein a modified overall status model is determined from the overall status model wherein the modified overall status model specifies optimal status transitions of the set of components.

16. The non-transitory media of claim 9, wherein the status transition dependencies are used to determine an optimal set of component status transitions in response to a status change of the plant.

* * * * *